United States Patent Office 2,873,289
Patented Feb. 10, 1959

2,873,289
MANUFACTURE OF MERCURIC ACETATE

Donald G. MacKellar, Kenmore, N. Y., assignor to Food Machinery and Chemical Corporation, San Jose, Calif.

No Drawing. Application April 22, 1957
Serial No. 654,081

10 Claims. (Cl. 260—431)

This invention relates to the preparation of mercuric acetate, and particularly to the preparation of mercuric acetate by reaction of metallic mercury with peracetic acid.

Peracetic acid is used in various chemical reactions, such as in the epoxidation and in the hydroxylation of unsaturated organic compounds. Initially, peracetic acid reactions were carried out with preformed peracetic acid. That is, the peracid was formed prior to its use by reaction of acetic acid and hydrogen peroxide in the presence of a strong acid catalyst. However, use of preformed peracetic acid involves wastage of about 20% of the hydrogen peroxide employed in forming the peracid, and furthermore involves serious handling problems in the manufacture, storage and shipment of the highly corrosive peracid.

Recent developments in the reaction of organic compounds with peracetic acid have shown that peracetic acid can be formed in situ in a reaction vessel by mixing together the organic compound to be reacted upon, acetic acid, and a strong acid catalyst, and adding to this mixture hydrogen peroxide. The hydrogen peroxide, catalyzed by the acid catalyst, reacts with the acetic acid to form peracetic acid which thereafter reacts with the organic compound. The in situ peracetic acid reaction method has met with immediate and widespread acceptance in the reaction of organic compounds, for the reason that it permits complete utilization of hydrogen peroxide, and therefore results in substantial economic savings, and further because it eliminates the problems of storage and shipment present in the handling of preformed peracetic acid.

F. P. Greenspan, in his U. S. Patent No. 2,661,360 of December 1, 1953, teaches that mercuric acetate can be formed by reaction of metallic mercury with preformed peracetic acid. While this method has suffered the economic and handling disadvantages recited above for preformed peracetic acid, it has been considered heretofore that efficient preparation of mercuric acetate by reaction of metallic mercury with peracetic acid formed in situ in the presence of metallic mercury would be impossible.

The reason for this belief is that hydrogen peroxide is known to be destroyed rapidly in the presence of heavy metals, e. g. mercury, silver, iron and the like, and use of hydrogen peroxide in the presence of such heavy metals normally is avoided except in cases where instantaneous destruction of the peroxide is desired, for example in the propulsion of rockets by hydrogen peroxide. This established art led prior workers to expect that if hydrogen peroxide were to be added to a mixture containing substantial amounts of metallic mercury, a major part of the hydrogen peroxide would decompose rapidly, and therefore would not be available for reaction with acetic acid to form peracetic acid. Accordingly, no attempt was made heretofore to adapt the efficient and economical in situ peracetic acid reaction method to the formation from metallic mercury of mercuric acetate.

It is a feature of this invention to provide a method of forming mercuric acetate by reaction of metallic mercury with peracetic acid formed in situ in the presence of the metallic mercury.

It is a further feature to provide such a method of forming mercuric acetate, wherein hydrogen peroxide utilized in forming the peracetic acid is substantially completely utilized in the conversion of metallic mercury to mercuric acetate.

According to the method of this invention, metallic mercury, acetic acid, and a strong acid catalyst are agitated and hydrogen peroxide is added to the mixture while it is undergoing agitation. Surprisingly, it has been found that addition of hydrogen peroxide to this mixture, which contains large amounts of the heavy metal, mercury, does not result in wasteful destruction of the hydrogen peroxide, but rather that substantially all of the active oxygen in the hydrogen peroxide is utilized in forming mercuric acetate. Accordingly, the present method provides an extremely efficient method of preparing mercuric acetate, and further eliminates from the preparation of mercuric acetate the expensive and frequently hazardous operations of preparing, storing and shipping preformed peracetic acid.

In the preferred embodiment of this invention, about 1–1.4 moles of hydrogen peroxide for each mole of mercury to be reacted, is added to an agitating mixture of metallic mercury containing at least about 2 moles of acetic acid for each mole of mercury to be reacted, and about 0.1 to 1%, based on the combined amounts of hydrogen peroxide and acetic acid, of a strong acid catalyst.

The reaction is believed to proceed initially through formation of mercurous acetate, and subsequently by oxidation of this material to mercuric acetate. The initial phase of the reaction normally is conducted at about 20° to 50° C., and is continued until the color of metallic mercury disappears. This usually takes about ½ to 1 hour. Following this, the oxidation to mercuric acetate is carried out at a temperature of at least about 80° C. It is desirable to avoid reaction temperatures in excess of the boiling point of the reaction mixture, as the conversion to mercuric acetate is an exothermic reaction and reaction control tends to be difficult at temperatures above about 90° to 100° C. Completion of the oxidation to the mercuric form is indicated by disappearance of cloudiness in the reaction mixture, and formation of a clear solution. It is possible to test for completion of the conversion to mercuric form by adding the product to acetic acid, in which mercurous acetate is insoluble, and mercuric acetate is soluble.

The catalyst employed for forming peracetic acid from hydrogen peroxide and acetic acid is a strongly acid material, preferably nitric acid, perchloric acid, boron trifluoride, chloroacetic acid, glycolic acid, or other strong acid which upon reaction with mercury forms reaction products which are water soluble. Acids which form insoluble reaction products are removed from the field of action and are not useful as catalysts herein. Such acids are exemplified by sulfuric acid and hydrochloric acid.

The catalyst is employed in the amount of about 0.1 to 1% based on the combined amounts of hydrogen peroxide and acetic acid. Use of lower amounts of catalysts causes the reaction to be slow and inefficient, while use of more than the indicated maximum causes wasting of catalyst and possible side reactions of mercury.

The hydrogen peroxide is employed in aqueous solution, and has a hydrogen peroxide concentration of between 27.5% to 90%. It is preferred to use approximately 50% concentration hydrogen peroxide, as this permits shipment of smaller volumes of the material and further because higher strengths of hydrogen peroxide requires special handling. One mole of hydrogen peroxide calculated as 100%, per mole of metallic mercury, is required for the present reaction. However, it is preferred to employ a slight excess of the peroxide, e. g. to provide a total hydrogen peroxide content of about 1.05 to 1.4 moles of hydrogen peroxide per mole of mercury, in order to speed up the reaction.

The following examples are given by way of illustration only, and are not intended to limit the process conditions, materials or amounts of materials useful in practice of the present method.

Example 1

150 grams of mercury metal, 450 grams of glacial acetic acid, and 7 grams of nitric acid were stirred together in a three neck flask equipped with a mechanical stirrer, a thermometer, and a reflux condenser. While the mixture was undergoing agitation it was brought to 40° C. and maintained at this temperature while 60 grams of 50% hydrogen peroxide was added slowly to it. The mixture was permitted to stir at 40° C. for about 30 minutes, at the end of which time a white suspension had formed in it. The temperature then was raised over a period of five minutes to 80° C., with continuing agitation. It was maintained at this temperature, with agitation, for an additional 30 minutes, at the end of which time the mixture had converted to a clear solution. At this time the solution was cooled to room temperature.

The solution was evaporated to dryness under vacuum, to provide 235 grams of product. There was no trace of metallic mercury or other insoluble residue, and the product was readily soluble in water and in acetic acid. The product obtained analyzed 62.6% mercury.

Example 2

150 grams of mercury metal, 250 grams of glacial acetic acid, 150 grams of water, 1 gram of boron trifluoride-ether complex ($BF_3 \cdot O(C_2H_5)_2$) and 54 grams of 50% hydrogen peroxide were reacted according to the process of Example 1. The product of the reaction was isolated as in Example 1, to provide 232 grams of a product which was readily soluble in water and acetic acid. This product contained 62.4% mercury, and as produced was free of metallic mercury.

Example 3

150 grams of metallic mercury, 450 grams of glacial acetic acid and 60 grams of 50% hydrogen peroxide were reacted together in the presence of 4 grams of 85% perchloric acid, according to the procedure recited in Example 1, with the exception that the initial reaction was carried out at 20° C. and for 45 minutes. The product was isolated according to the procedure recited in Example 1, to produce 237 grams of mercuric acetate, which was readily soluble in water and in acetic acid. The mercuric acetate product contained 62.3% of mercury.

Example 4

150 grams of metallic mercury, 450 grams of glacial acetic acid, and 33.3 grams of 90% hydrogen peroxide were reacted in the presence of 0.7 gram of concentrated nitric acid, according to the process set forth in Example 1, with the exception that the process there recited was modified by carrying out the initial reaction over a period of 45 minutes. The product was isolated according to the process recited in Example 1, and 230 grams of a material soluble in water and in acetic acid was obtained. The product contained 62.6% mercury.

The present process permits manufacture of mercuric acetate in substantially theoretical yields, and involves substantial economic savings and processing advantages over prior art methods of using preformed peracetic acid. The instant method and its advantages are made possible by the discovery that hydrogen peroxide can be utilized efficiently in the presence of the heavy metal mercury, without undue decomposition of the hydrogen peroxide by the metal.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. In the method of making mercuric acetate by reacting metallic mercury with peracetic acid, the improvement comprising forming the peracetic acid in situ in the metallic mercury containing reaction environment, by reaction of acetic acid with hydrogen peroxide in the presence of, as a catalyst, a strong acid which forms water soluble reaction products with mercury.

2. Method of claim 1 wherein the catalyst from the group consisting of nitric acid, perchloric acid, boron trifluoride, chloroacetic acid, and glycolic acid.

3. Method of claim 1 wherein the catalyst is nitric acid.

4. Method of claim 1 wherein the catalyst is perchloric acid.

5. Method of claim 1 wherein the catalyst is boron trifluoride.

6. Method of preparing mercuric acetate by reaction of metallic mercury with peracetic acid, which method comprises reacting together metallic mercury, about 2 moles of acetic acid per mole of mercury to be reacted, about 1 mole of hydrogen peroxide per mole of mercury to be reacted, and about 0.1 to 1% of a strong acid which forms soluble reaction products with mercury.

7. Method of claim 6 wherein the catalyst is from the group consisting of nitric acid, perchloric acid, boron trifluoride, chloracetic acid, and glycolic acid.

8. Method of claim 6 wherein the catalyst is nitric acid.

9. Method of claim 6 wherein the catalyst is perchloric acid.

10. Method of claim 6 wherein the catalyst is boron trifluoride.

References Cited in the file of this patent

UNITED STATES PATENTS 2,661,360    Greenspan _____ Dec. 1, 1953